United States Patent
Ingalls

(10) Patent No.: US 6,213,685 B1
(45) Date of Patent: Apr. 10, 2001

(54) MECHANICAL BOOT SYSTEM

(76) Inventor: Peter W. Ingalls, 970 Windway Cir., Kissimmee, FL (US) 34744

(*) Notice: Subject to any disclaimer, the term of this patent is extended or adjusted under 35 U.S.C. 154(b) by 0 days.

(21) Appl. No.: 09/433,764

(22) Filed: Nov. 4, 1999

(51) Int. Cl.$^7$ ................. B09B 1/00; G21F 9/00
(52) U.S. Cl. ............ 405/129; 405/128; 138/26; 138/177; 285/100; 285/107; 285/115; 285/299; 285/415; 403/51
(58) Field of Search ................. 405/128, 129, 405/150.1, 157; 166/75.11, 242.1; 138/26, 89, 177, DIG. 8, DIG. 11; 285/61, 100, 107, 115, 299, 415; 403/50, 51; 277/634

(56) References Cited

U.S. PATENT DOCUMENTS

| | | | |
|---|---|---|---|
| 2,233,125 | * 2/1941 | Gill | 405/129 |
| 3,486,528 | * 12/1969 | de Frees | 405/129 |
| 4,464,081 | * 8/1984 | Hillier et al. | 405/128 |
| 5,120,161 | * 6/1992 | Faussone | 405/129 |
| 5,211,428 | * 5/1993 | Emerson et al. | 285/158 |
| 5,259,697 | * 11/1993 | Allen et al. | 405/129 |
| 5,641,245 | * 6/1997 | Pemberton et al. | 405/128 |
| 5,863,152 | * 1/1999 | Ingalls | 405/129 |
| 6,056,018 | * 5/2000 | Renaud | 138/121 |

* cited by examiner

Primary Examiner—Eileen D. Lillis
Assistant Examiner—Gary S. Hartmann

(57) ABSTRACT

A mechanical type boot including a vertically positioned riser in a tubular configuration with an outwardly flanged upper end and an outwardly flanged lower end. Vertical bolt holes are provided through the ends. Vertical bolt holes are provided in a lower flat end of a base flange. Vertical bolt holes are also provided in a flanged lower end of a generally cylindrical split seal cap ring. Vertically extending bolts couple the riser, seal and base flange. An inverted J-shaped tube constitutes a gas well pipe. The tube has a long vertical section located within and extending upwardly from the split seal cap ring. The next intermediate section extends outwardly. A third outboard section extends downwardly for the exhaust of gasses. The lowermost end of the gas well pipe is held in a fluid type relationship with regard to the split seal cap ring. An intermediate expandable bellows in a vertical orientation has an upper horizontal flange with vertical apertures aligned with the holes in the flanged lower end of the split seal cap ring. Securement bolts are provided between the bellows and split seal cap ring. The lower end of the bellows has a lower horizontal flange and is provided with vertical holes which are aligned with the holes at the upper end of the riser. Coupling bolts extend through the holes in horizontal flange and the holes in the upper end of the riser. The intermediate extent of the bellows is formed with flexible undulations to allow its contraction and expansion.

4 Claims, 3 Drawing Sheets

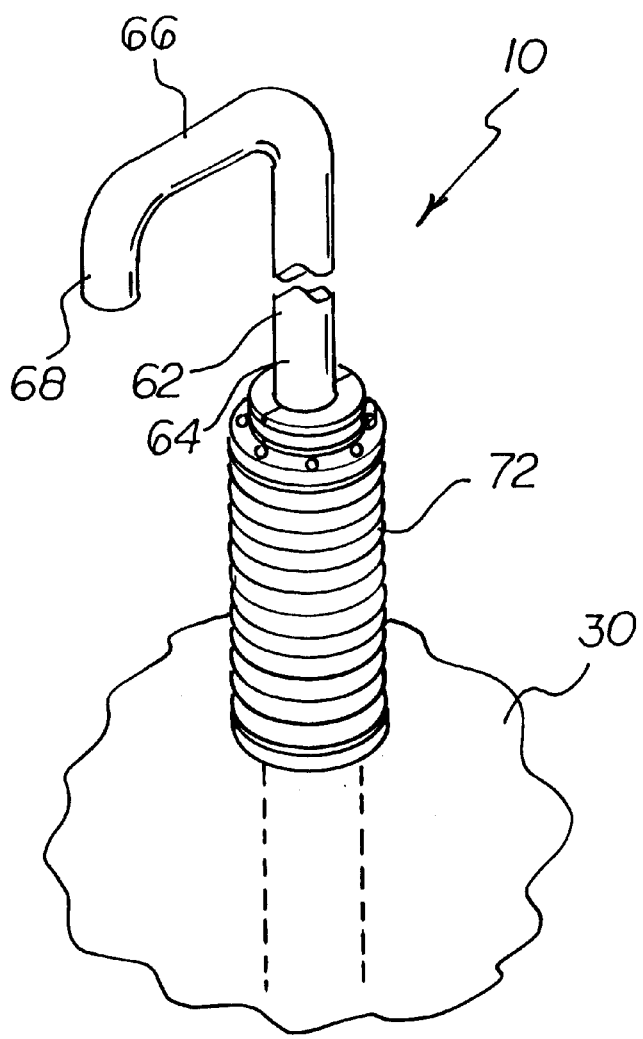
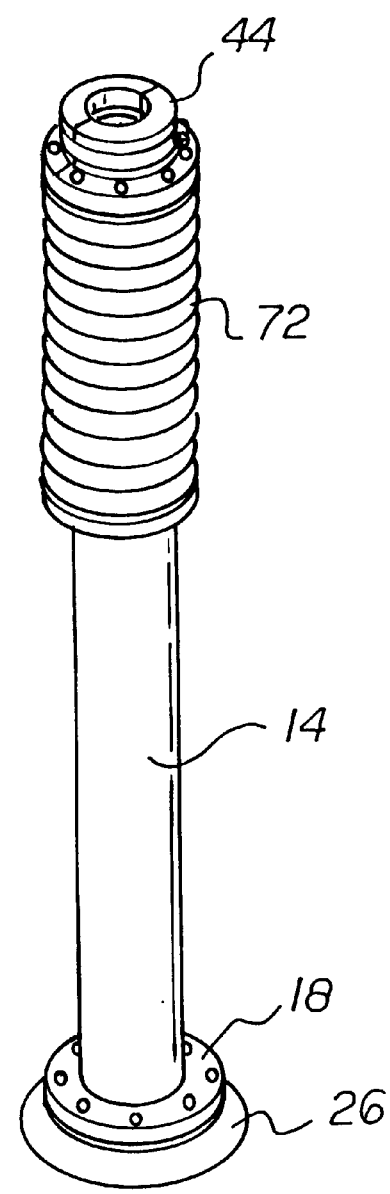
FIG. 1
FIG. 2

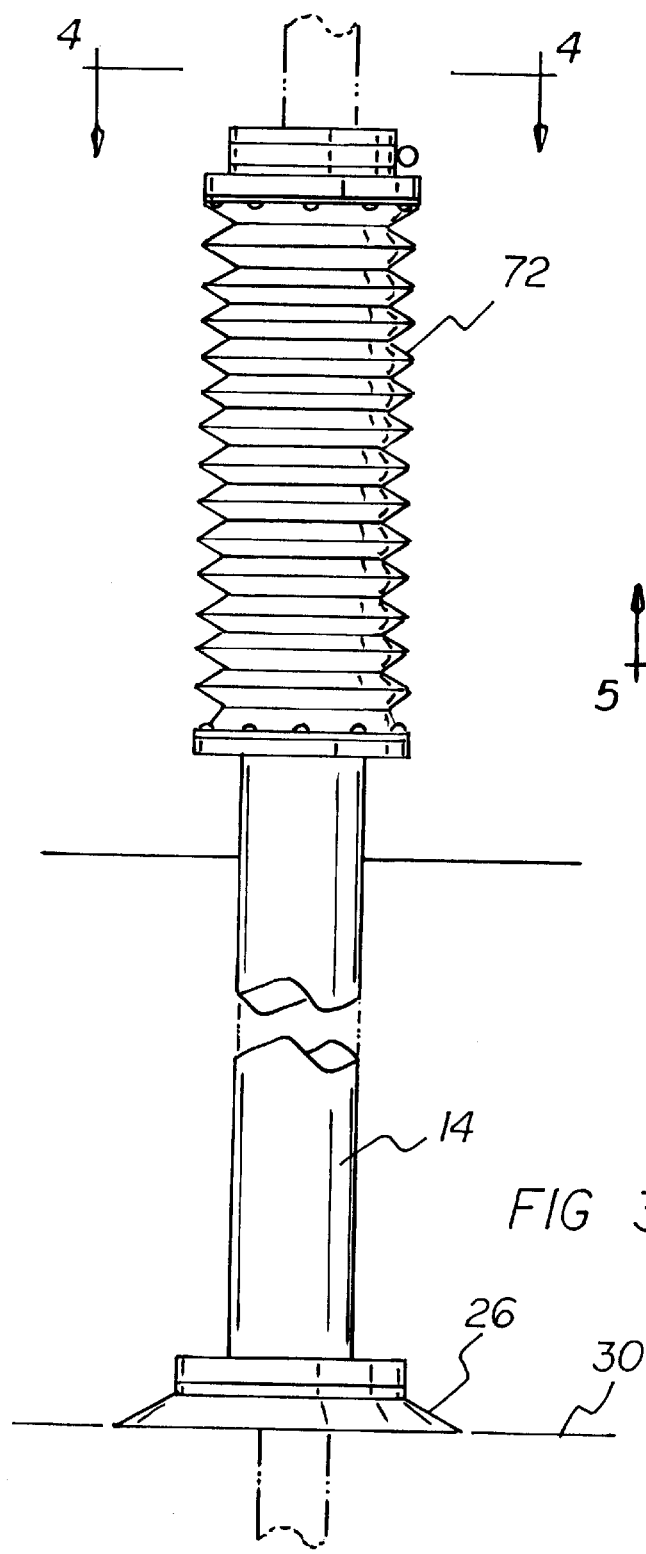
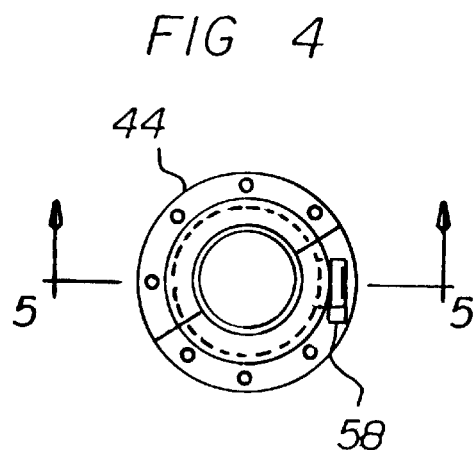
FIG 3
FIG 4

MECHANICAL BOOT SYSTEM

BACKGROUND OF THE INVENTION

1. Field of the Invention

The present invention relates to a mechanical boot system and more particularly pertains to positioning an expanding section in a mechanical type boot system to allow settling in the subgrade of landfill as the refuse deteriorates without damage to the boot or liner.

2. Description of the Prior Art

The use of land fill systems and equipment of known designs and configurations is known in the prior art. More specifically, land fill systems and equipment of known designs and configurations heretofore devised and utilized for the purpose of attending to land fill systems in a safe and cost effective manner through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,863,152 to Ingalls discloses a mechanical gas vent. Further, U.S. Pat. No. 5,120,161 to Faussone discloses an apparatus for the controlled disposal of waste and method therefor.

While these devices fulfill their respective, particular objectives and requirements, the aforementioned patents do not describe a mechanical boot system that allows positioning an expanding section in a mechanical type boot system to allow settling in the subgrade of landfill as the refuse deteriorates without damage to the boot or liner.

In this respect, the mechanical boot system according to the present invention substantially departs from the conventional concepts and designs of the prior art, and in doing so provides an apparatus primarily developed for the purpose of positioning an expanding section in a mechanical type boot system to allow settling in the subgrade of landfill as the refuse deteriorates without damage to the boot or liner.

Therefore, it can be appreciated that there exists a continuing need for a new and improved mechanical boot system which can be used for positioning an expanding section in a mechanical type boot system to allow settling in the subgrade of landfill as the refuse deteriorates without damage to the boot or liner. In this regard, the present invention substantially fulfills this need.

SUMMARY OF THE INVENTION

In view of the foregoing disadvantages inherent in the known types of land fill systems and equipment of known designs and configurations now present in the prior art, the present invention provides an improved mechanical boot system. As such, the general purpose of the present invention, which will be described subsequently in greater detail, is to provide a new and improved mechanical boot system and method which has all the advantages of the prior art and none of the disadvantages.

To attain this, the present invention essentially comprises a mechanical boot system including an expandable section which allows settling in the subgrade of a landfill as the refuse deteriorates without damage to the boot or the liner. A vertically positioned riser in a tubular configuration is fabricated of high density polyethylene plastic with a height of about 2.5 feet. The riser has an outwardly flanged upper end and an outwardly flanged lower end. Vertical bolt holes extend through the ends. A high density polyethylene base flange has a lower flat end welded to a refuse liner and is provided with vertical threaded bolt holes. A rubber seal is positioned between the lower surface of the lower end of the riser and the upper end of the base flange. Vertically extending bolts are provided and extend through bolt holes for coupling between the riser, seal and base flange. A split seal cap ring in a generally cylindrical configuration has a flanged lower end with vertical threaded bolt holes and an interior annular recess. A rubber O-ring is located within the interior annular recess. An exterior recess has a rectangular cross-section. A stainless steel band is located around the exterior recess. A bolt is provided for tightening purposes. An inverted J-shaped tube constitutes a gas well pipe. The tube has a long vertical section located within the split seal cap ring. The vertical section extends upwardly then outwardly in an intermediate section and downwardly in an outboard section for the exhaust of gasses. The lowermost end of the gas well pipe is held in a fluid type relationship with regard to the split seal cap ring through the application of forces of the O-ring as effected by the tightening of the band. Lastly provided is an intermediate expandable bellows. The bellows is in a vertical orientation and has an upper horizontal flange. Vertical apertures are aligned with the holes in the flanged lower end of the split seal cap ring. Securement bolts are provided. The lower end of the bellows has a lower horizontal flange with vertical holes aligned with the holes at the upper end of the riser and coupling bolts are provided. The intermediate extent of the bellows is formed with flexible undulations to allow its contraction under the force or gravity and its expansion under the force of gasses from beneath the liner tending to escape upwardly through the base flange, riser, bellows, split seal cap ring and gas well pipe.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mechanical boot system which has all of the advantages of the prior art land fill systems and equipment of known designs and configurations and none of the disadvantages.

It is another object of the present invention to provide a new and improved mechanical boot system which may be easily and efficiently manufactured and marketed.

It is a further object of the present invention to provide a new and improved mechanical boot system which is of durable and reliable construction.

An even further object of the present invention is to provide a new and improved mechanical boot system which is susceptible of a low cost of manufacture with regard to both materials and labor, and which accordingly is then susceptible of low prices of sale to the consuming public, thereby making such mechanical boot system economically available to the buying public.

Even still another object of the present invention is to provide a mechanical boot system for positioning an expanding section in a mechanical type boot system to allow settling in the subgrade of landfill as the refuse deteriorates without damage to the boot or liner.

Lastly, it is an object of the present invention to provide a new and improved mechanical type boot including a vertically positioned riser in a tubular configuration with an outwardly flanged upper end and an outwardly flanged lower end. Vertical bolt holes are provided through the ends. Vertical bolt holes are provided in a lower flat end of a base flange. Vertical bolt holes are also provided in a flanged lower end of a generally cylindrical split seal cap ring. Vertically extending bolts couple the riser, seal and base flange. An inverted J-shaped tube constitutes a gas well pipe. The tube has a long vertical section located within and extending upwardly from the split seal cap ring. The next intermediate section extends outwardly. A third outboard section extends downwardly for the exhaust of gasses. The lowermost end of the gas well pipe is held in a fluid type relationship with regard to the split seal cap ring. An intermediate expandable bellows in a vertical orientation has an upper horizontal flange with vertical apertures aligned with the holes in the flanged lower end of the split seal cap ring. Securement bolts are provided between the bellows and split seal cap ring. The lower end of the bellows has a lower horizontal flange and is provided with vertical holes which are aligned with the holes at the upper end of the riser. Coupling bolts extend through the holes in the horizontal flange and the holes in the upper end of the riser. The intermediate extent of the bellows is formed with flexible undulations to allow its contraction and expansion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the new and improved mechanical boot system constructed in accordance with the principles of the present invention.

FIG. 2 is perspective illustration of the central section of the system shown in FIG. 1.

FIG. 3 is a side elevational view of the components shown in FIG. 2.

FIG. 4 is a cross sectional view taken along line 4—4 of FIG. 3.

The same reference numerals refer to the same parts throughout the various Figures.

DESCRIPTION OF THE PREFERRED EMBODIMENT

Figure 5:
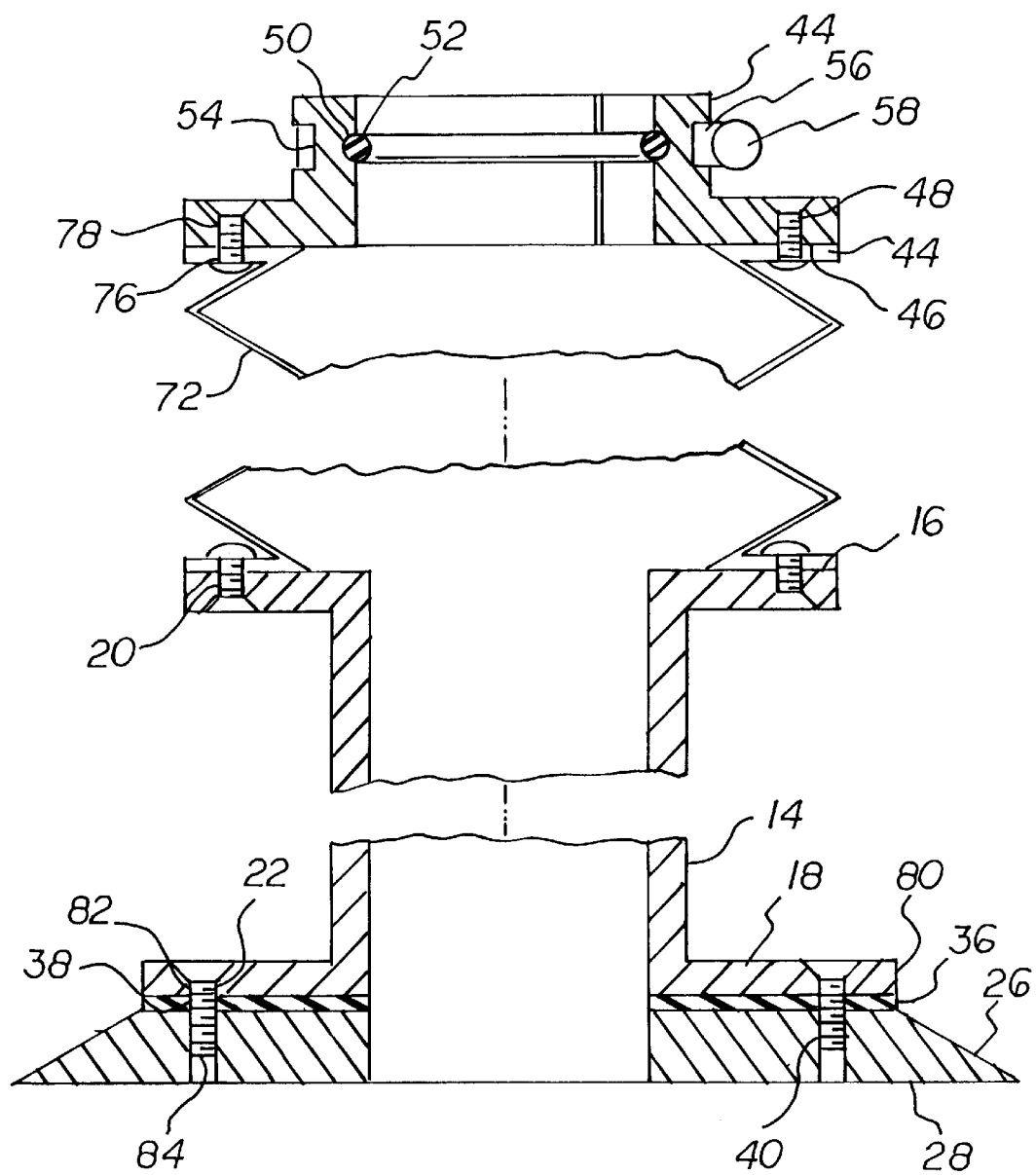
FIG. 5 is a cross sectional view taken long line 5—5 of FIG. 4 with parts removed to show certain internal constructions thereof.

With reference now to the drawings, and in particular to FIG. 1 thereof, the preferred embodiment of the new and improved mechanical pipe boot embodying the principles and concepts of the present invention and generally designated by the reference numeral 10 will be described.

The present invention, the mechanical boot system 10 is comprised of a plurality of components. Such components in their broadest context include a vertically positioned riser, a base flange, vertically extending bolts for coupling the riser and flange, a split seal cap ring, an inverted J-shaped tube constituting a gas well pipe, and an intermediate expandable bellows. Such components are individually configured and correlated with respect to each other so as to attain the desired objective.

The mechanical boot system includes an expandable section which allows settling in the subgrade of a landfill as the refuse deteriorates without damage to the boot or the liner. A vertically positioned riser 14 in a tubular configuration is fabricated of high density polyethylene plastic with a height of about 2.5 feet. The riser has an outwardly flanged upper end 16 and an outwardly flanged lower end 18. Vertical bolt holes 20, 22 extend through the ends.

A high density polyethylene base flange 26 has a lower flat end 28 welded to a refuse liner 30 and is provided with vertical threaded bolt holes 32.

A rubber seal 36 is positioned between the lower surface of the lower end of the riser and the upper end of the base flange. Vertically extending bolts 40 are provided and extend through bolt holes 38 for coupling between the riser, seal and base flange.

A split seal cap ring 44 in a generally cylindrical configuration has a flanged lower end 46 with vertical threaded bolt holes 48 and an interior annular recess 50. A rubber O-ring 52 is located within the interior annular recess. An exterior recess 54 has a rectangular cross-section. A stainless steel band 56 is located around the exterior recess. A bolt 58 is provided for tightening purposes.

An inverted J-shaped tube 62 constitutes a gas well pipe. The tube has a long vertical section 64 located within the split seal cap ring. The vertical section extends upwardly then outwardly in an intermediate section 66 and downwardly in an outboard section 68 for the exhaust of gasses. The lowermost end of the gas well pipe is held in a fluid type relationship with regard to the split seal cap ring through the application of forces of the O-ring as effected by the tightening of the band.

Lastly provided is an intermediate expandable bellows 72. The bellows is in a vertical orientation and has an upper horizontal flange 74. Vertical apertures 76 are aligned with the holes in the flanged lower end of the split seal cap ring. Securement bolts 78 are provided. The lower end of the bellows has a lower horizontal flange 80 with vertical holes 82 aligned with the holes at the upper end of the riser. Coupling bolts 84 are provided. The intermediate extent of the bellows is formed with flexible undulations to allow its contraction under the force of gravity and its expansion under the force of gasses from beneath the liner tending to escape upwardly through the base flange, riser, bellows, split seal cap ring and gas well pipe.

There are many advantages to the present invention over the present system in use. This mechanical boot has only a flange welded to the liner and all of the remaining parts are bolted or clamped together. The advantage of this is if a section should get damaged, it can be replaced without replacing the entire boot. Another advantage is the expandability of the bellows section. The expandability of the bellows allows settling in the subgrade as the refuse deteriorates without damage to the boot or the liner system.

The base flange is welded to the liner and the gasket is set in place. The 2.5 foot riser is bolted to this base flange to insure the bellows is above the soil cover for proper operation. The bottom of the bellows is then attached to the riser an the split seal cap section is attached to the top of the bellows. The stainless steel band is then placed around the cap and tightened to clamp and seal the boot to the gas well pipe.

The entire boot is made of high density polyethylene plastic, rubber, and assembled with stainless steel bolts, screws, and clamps to decrease degradation and extend the life. With only one piece welded directly to the liner system, this minimizes the chance of failure in the pipe penetration boot.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved mechanical type boot system with an expandable section to allow settling in the subgrade of a landfill as the refuse deteriorates without damage to the boot or the liner comprising, in combination:

a vertically positioned riser in a tubular configuration fabricated of high density polyethylene plastic with a height of about 2.5 feet with an outwardly flanged upper end and an outwardly flanged lower end and with vertical bolt holes through the ends;

a high density polyethylene base flange having a lower flat end welded to a refuse liner and with vertical threaded bolt holes therethrough;

a rubber seal positioned between the lower surface of the lower end of the riser and the upper end of the base flange with bolt holes therethrough and vertically extending bolts for the coupling between the riser, seal and base flange;

a split seal cap ring in a generally cylindrical configuration having a flanged lower end with vertical threaded bolt holes therethrough and with an interior annular recess with a rubber O-ring therewithin and with an exterior recess with a rectangular cross-section with a stainless steel band there around with a bolt for tightening purposes;

an inverted J-shaped tube constituting a gas well pipe having a long vertical section located within the split seal cap ring and extending upwardly therefrom, then outwardly in an intermediate section and downwardly in an outboard section for the exhaust of gasses, the lowermost end of the gas well pipe being held in a fluid type relationship with regard to the split seal cap ring through the application of forces of the O-ring as effected by the tightening of the band; and an intermediate expandable bellows in a vertical orientation having an upper horizontal flange with vertical apertures aligned with the holes in the flanged lower end of the split seal cap ring and with securement bolts therebetween, the lower end of the bellows having a lower horizontal flange with vertical holes therethrough aligned with the holes at the upper end of the riser with coupling bolts therebetween and with the intermediate extent of the bellows being formed with flexible undulations to allow its contraction under the force of gravity and its expansion under the force of gasses from beneath the liner tending to escape upwardly through the base flange, riser, bellows, split seal cap ring and gas well pipe.

2. A new and improved mechanical type boot comprising:

a vertically positioned riser in a tubular configuration with an outwardly flanged upper end and an outwardly flanged lower end and with vertical bolt holes through the ends;

a base flange having a lower flat end and with vertical bolt holes therethrough;

vertically extending bolts for the coupling between the riser, seal and base flange;

a split seal cap ring in a generally cylindrical configuration having a flanged lower end with vertical bolt holes therethrough;

an inverted J-shaped tube constituting a gas well pipe having a long vertical section located within the split seal cap ring and extending upwardly therefrom, then outwardly in an intermediate section and downwardly in an outboard section for the exhaust of gasses, the lowermost end of the gas well pipe being held in a fluid type relationship with regard to the split seal cap ring; and an intermediate expandable bellows in a vertical orientation having an upper horizontal flange with vertical apertures aligned with the holes in the flanged lower end of the split seal cap ring and with securement bolts therebetween, the lower end of the bellows having a lower horizontal flange with vertical holes therethrough aligned with the holes at the upper end of the riser with coupling bolts therebetween and with the intermediate extent of the bellows being formed with flexible undulations to allow its contraction and its expansion.

3. The mechanical type boot system as set forth in claim 2 and further including a rubber seal posistioned between the lower surface of the lower end of the riser and the upper end of the base flange with bolt holes therethrough.

4. The mechanical type boot system as set forth in claim 2 and further including in the split seal cap ring an interior annular recess with a rubber O-ring therewithin and with an exterior annular recess with a rectangular cross-section with a stainless steel band there around for tightening purposes.

* * * * *